United States Patent
Barjon et al.

(10) Patent No.: US 8,305,588 B2
(45) Date of Patent: Nov. 6, 2012

(54) POSITION-MEASURING METHOD AND DEVICE ADAPTED FOR THE POSITIONING OF A WHEEL

(75) Inventors: Stéphane Barjon, Cournon d'Auvergne (FR); Hervé Thomasson, Seyssuel (FR)

(73) Assignee: Siemens VAI Metals Technologies SAS, Saint-Chamond (FR)

( * ) Notice: Subject to any disclaimer, the term of this patent is extended or adjusted under 35 U.S.C. 154(b) by 234 days.

(21) Appl. No.: 12/937,395

(22) PCT Filed: Apr. 11, 2008

(86) PCT No.: PCT/FR2008/000505
§ 371 (c)(1),
(2), (4) Date: Oct. 12, 2010

(87) PCT Pub. No.: WO2009/125073
PCT Pub. Date: Oct. 15, 2009

(65) Prior Publication Data
US 2011/0032540 A1    Feb. 10, 2011

(51) Int. Cl.
*G01N 21/47* (2006.01)
(52) U.S. Cl. .................................................. 356/614
(58) Field of Classification Search .................. None
See application file for complete search history.

(56) References Cited

U.S. PATENT DOCUMENTS

| 3,446,933 A | 5/1969 | Taylor et al. |
| 3,909,578 A | 9/1975 | Williams et al. |
| 4,144,440 A * | 3/1979 | Schalch et al. ............... 219/61.5 |
| 5,346,149 A * | 9/1994 | Cobb ......................... 242/441.3 |

FOREIGN PATENT DOCUMENTS
GB   681075 A   10/1952

* cited by examiner

*Primary Examiner* — Tu Nguyen
(74) *Attorney, Agent, or Firm* — Laurence A. Greenberg; Werner H. Stemer; Ralph E. Locher

(57) ABSTRACT

A measuring method and a device are adapted for the positioning of a wheel for mash seam resistance welding in the butt-joining of steel strips on continuous processing lines. A rotary roller which is fastened to a movable frame is positioned in a measuring position that is vertically below a reference wheel. The reference wheel is lowered vertically to come into contact and bear on the rotary roller. A distance between an index on a measuring arm of the frame and an articulated column is repeatedly measured during the continuous lowering movement of the roller. The distance is compared with a distance threshold for each of the repeated measurements until the wheel reaches a first operating position where the distance equals a predefined distance threshold factor. The first operating position is recorded as a reference point in a system for the vertical movement of the reference wheel.

11 Claims, 4 Drawing Sheets

POSITION-MEASURING METHOD AND DEVICE ADAPTED FOR THE POSITIONING OF A WHEEL

BACKGROUND OF THE INVENTION

Field of the Invention

The invention relates to the positioning of a wheel adapted for electrical seam resistance welding, more particularly to the method known as "mash welding" of continuously running steel strips.

The methods for processing continuously running steel strips such as cold rolling, chemical etching, galvanization and annealing use devices capable of butt-joining, by welding, the leading edge of a new strip to the trailing edge of the strip previously introduced into the processing line, a storage device permitting the strip to be stored and then returned downstream when the welding has been carried out.

One of the methods generally used is mash seam resistance welding known as "mash welding" or "mash lap welding" or "mash seam welding". In this method, the butt welding of the strip ends which are arranged with a slight overlap is carried out by passing an appropriate welding current between two wheels clamped at a specific pressure. Such a welding installation is disclosed in the U.S. Pat. Nos. 3,446,933 and 3,909, 578. In order to permit the butt-joined strip to pass through the entire processing installation without the strip breaking and without damaging the processing machines, it is necessary for the excessive thickness of the weld to be as small as possible. To this end, the overlapping length of the two edges to be welded has to be kept very short in order to limit the width of the inevitable bead which will then be crushed by the mashing rollers located downstream of the welding wheels. In some instances, further rollers known as "pre-mashing" rollers complement the device and are located upstream of the welding wheels.

In the known manner, the quality of a roller weld depends on the nature of the position of the edges to be welded: the vertical plane passing through the wheels has to be perfectly perpendicular to the plane of the jaws providing the clamping of the ends of the strip to be welded; and the height of the wheels has to be perfectly adjusted relative to the clamping jaws. In the particular case of "mash welding", a small overlap of the edges to be welded, in the region of 0.7 to 0.8 times the thickness of the strip to be welded, further increases these restrictions and requires particular structural arrangements to ensure the precision and repetition of the movements of the jaws and the carriages carrying the welding wheels and the mashing rollers. This problem, which is already significant for average thicknesses—in the order of millimeters and above—becomes absolutely critical for smaller thicknesses. Moreover, the mechanical quality of the welding machine is not sufficient on its own to ensure the quality of the welded joint, as it is also imperative that the edges to be welded are presented exactly at the height of the wheels, more specifically the wear of said wheels makes their positioning increasingly inaccurate as their diameter is reduced and it is necessary to adjust them regularly. To achieve this, an active face of one of the two wheels which will serve as a reference wheel, i.e. the wheel which is not actuated by the hydraulic cylinder for applying the welding force, generally the upper wheel, is adjusted relative to a reference plane, for example the lower face of the upper clamping jaws. To achieve this, an operator has to make the machine safe by disconnecting all sources of energy, including residual energy, of the machine, and ensuring that all the arrangements are made on the continuous processing line so that the strip is not introduced at an inappropriate time into the machine. Thus, the operator creates the reference plane, for example using a ruler placed against a reference face of the jaws and then adjusts the position of the reference wheel. Such an operation requires the use of safety procedures which stop the activity of the processing line during the entire adjusting operation. Such procedures which impair the productivity of the installation are to be avoided at all costs, unless the operator is in danger.

BRIEF SUMMARY OF THE INVENTION

The object of the present invention is to provide a measuring method and device for automatically positioning the wheel, which aims to avoid any manual intervention by the operator.

The subject of the invention and its advantages will be better understood by means of examples given in the following figures:

DESCRIPTION OF THE INVENTION

The figures disclose a tool in which the reference wheel MS is the upper wheel. The invention is also valid for the case where the reference wheel is the lower wheel.

Figure 1:
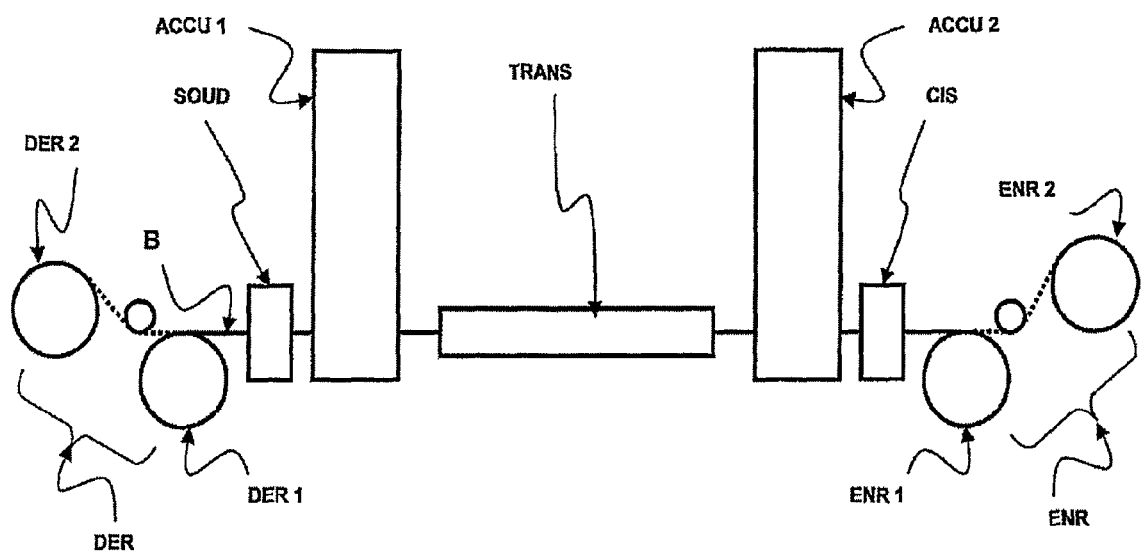
FIG. 1: overall layout of a processing line for continuously running steel strips.

FIG. 1 shows the overall layout of a processing line for continuously running steel strips. A first strip is unwound on an unwinding assembly (DER) comprising two unwinders (DER 1, DER 2). A welding machine (SOUD) permits the welding of a trailing edge of the first strip to a leading edge of a second subsequent strip, the two strips thus welded forming a welded strip (B). A storage device (ACCU 1) stores the welded strip (B) when it passes through. This assembly constitutes the inlet section of the processing line. The strip (B) then passes into a processing section (TRANS) where it may be subjected exclusively or successively to operations, including chemical etching, cold rolling, annealing, galvinization, painting, etc. Having been subjected to the processing operations, the strip (B) then enters an outlet section where it is stored in an outlet storage device (ACCU 2), cut by shears (CIS), then wound in the form of processed reels onto a winding device (ENR) comprising one or two winders (ENR 1, ENR 2).

Figure 2:
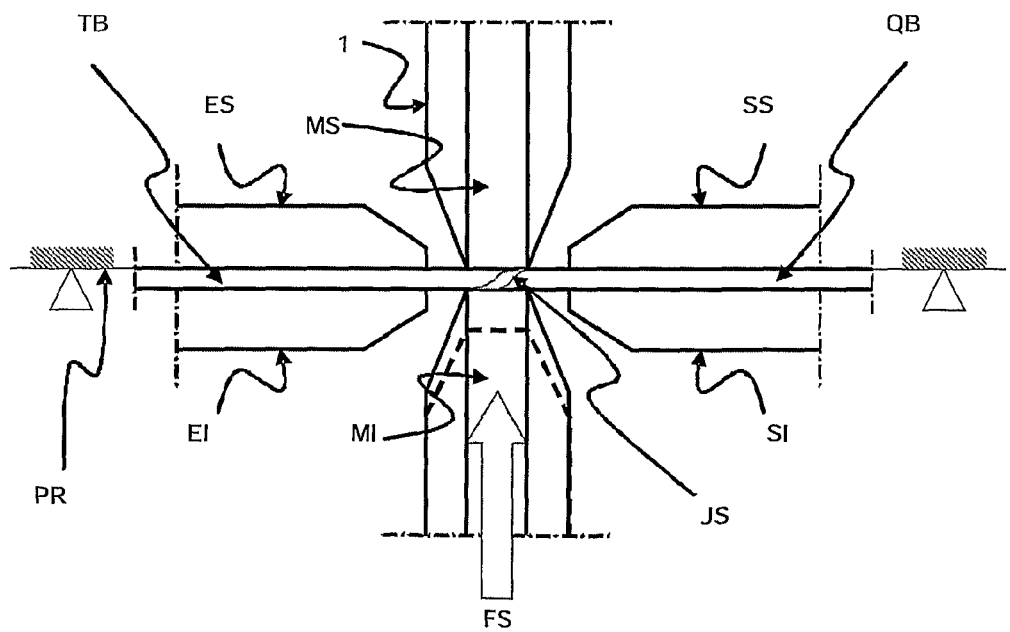
FIG. 2: typical arrangement of the welding members of a mash seam resistance welding machine.

FIG. 2 shows a typical arrangement of the welding members of a mash seam resistance welding machine. The trailing edge of the first strip (QB) is gripped by outlet jaws (SS and SI) of the welding machine, the leading edge of the following strip (TB) is gripped by inlet jaws (ES, EI). The trailing edge of the strip (QB) and the leading edge of the strip (TB) form a joint to be welded (JS). The upper face of the welded strip (B) which is also the lower face of the upper inlet jaws (ES)

and outlet jaws (SS) corresponds to a reference plane (PR) relative to which a reference wheel has to be adjusted. In the view of FIG. 2, a clamping cylinder applies a force (FS) to a lower wheel (MI). The reference wheel as the upper wheel (MS) is fixed to a welding head (1). The contact surface with the strip (B) has to be contained within the reference plane (PR) or possibly at a given distance from said plane (PR) with, in practice, a tolerance of several hundredths of a millimeter.

Figure 3A:
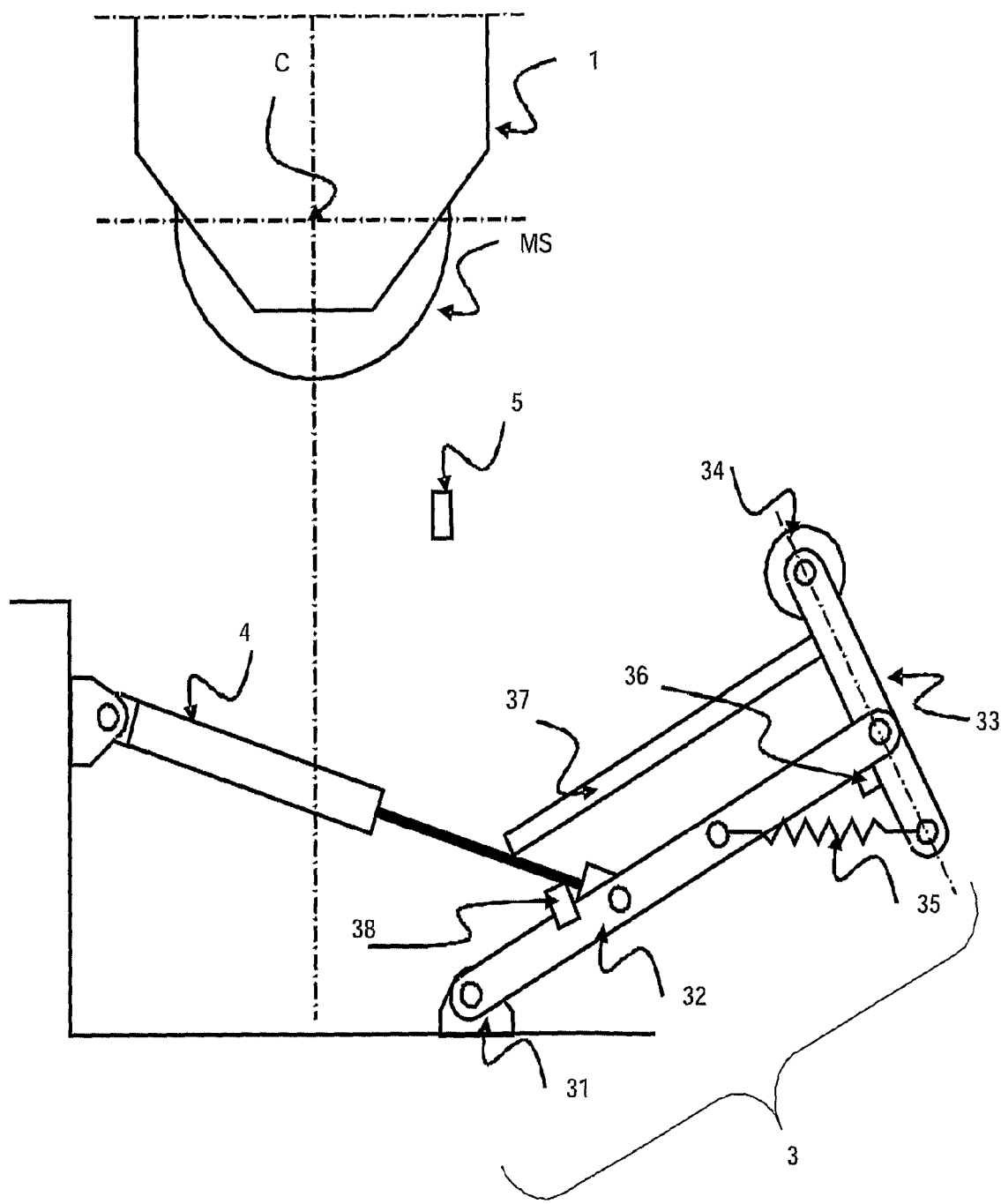
FIG. 3a: operating sequence of the adjusting device according to the invention: adjusting tool in the resting position

FIG. 3a shows the adjusting tool in the resting position. It comprises a tiltable frame (3) able to be put in an active measuring position or in a resting position by a hydraulic cylinder (4). Said frame (3) consists of a pivot clevis (31) to which a post (32) is articulated, to which in turn an arm (33) is articulated. The arm (33) is held in the resting position shown in FIG. 3a) by a stop (36) fixed to the post (32) and a resilient return member (35). The arm (33) supports a rotating roller (34) and an index (37) fixed to one side of the arm (33). One free edge of the index (37) is placed so that its position may be measured by a position detection and measuring device (38). A device stop (5), fixed to a structure, not shown, of the welding machine prevents a movement of the frame (3) beyond the active measuring position. The reference wheel is fixed to a welding head (1) in a suspension point (C).

Figure 3B:
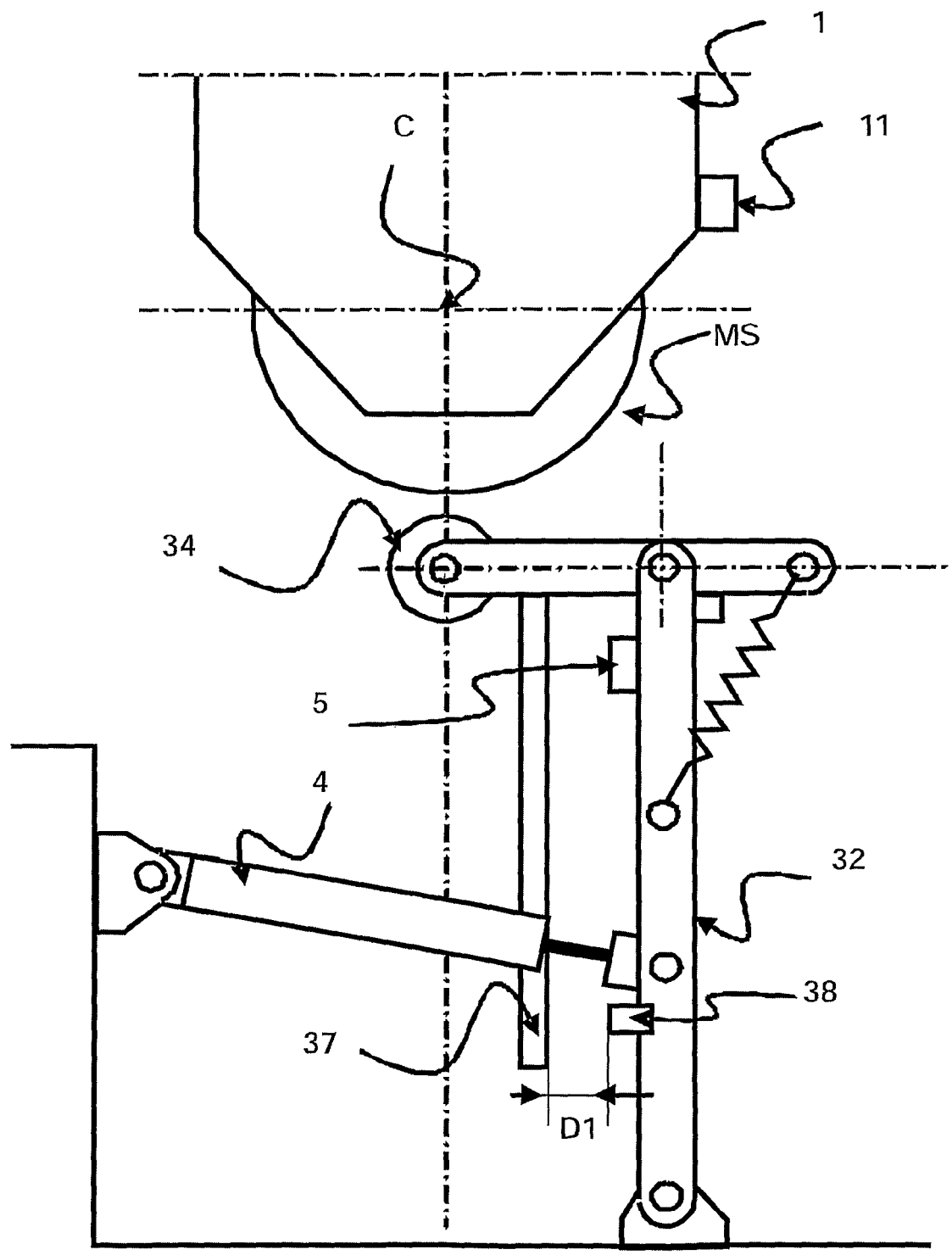
FIG. 3b: operating sequence of the adjusting device according to the invention: tool in the vertical position below the welding head

FIG. 3b shows the tool in the vertical position below the welding head (1) in the parking position, said welding head (1) being held in position on a fixed welding head stop (11). The tool is, in turn, held in position on the fixed device stop (5) which permits a lower face of the wheel (MS) to be perpendicular with an upper face of the roller (34). In this situation, the index (37) is at a maximum distance (D1) from the position detection and measuring device (38). The term "upper face" means the horizontal plane, tangential to the roller and arranged at the highest point of the surface of said roller. The term "lower face" means the horizontal plane, tangential to the wheel (MS) and arranged at the lowest point of the surface of the wheel (MS). The terms "lower face" and "upper face" are used for reasons of clarity. In other words, as the wheels are in rotation, the lower face and the upper face respectively denote an active surface of the reference wheel MS and an active surface of the lower wheel MI.

Figure 3C:
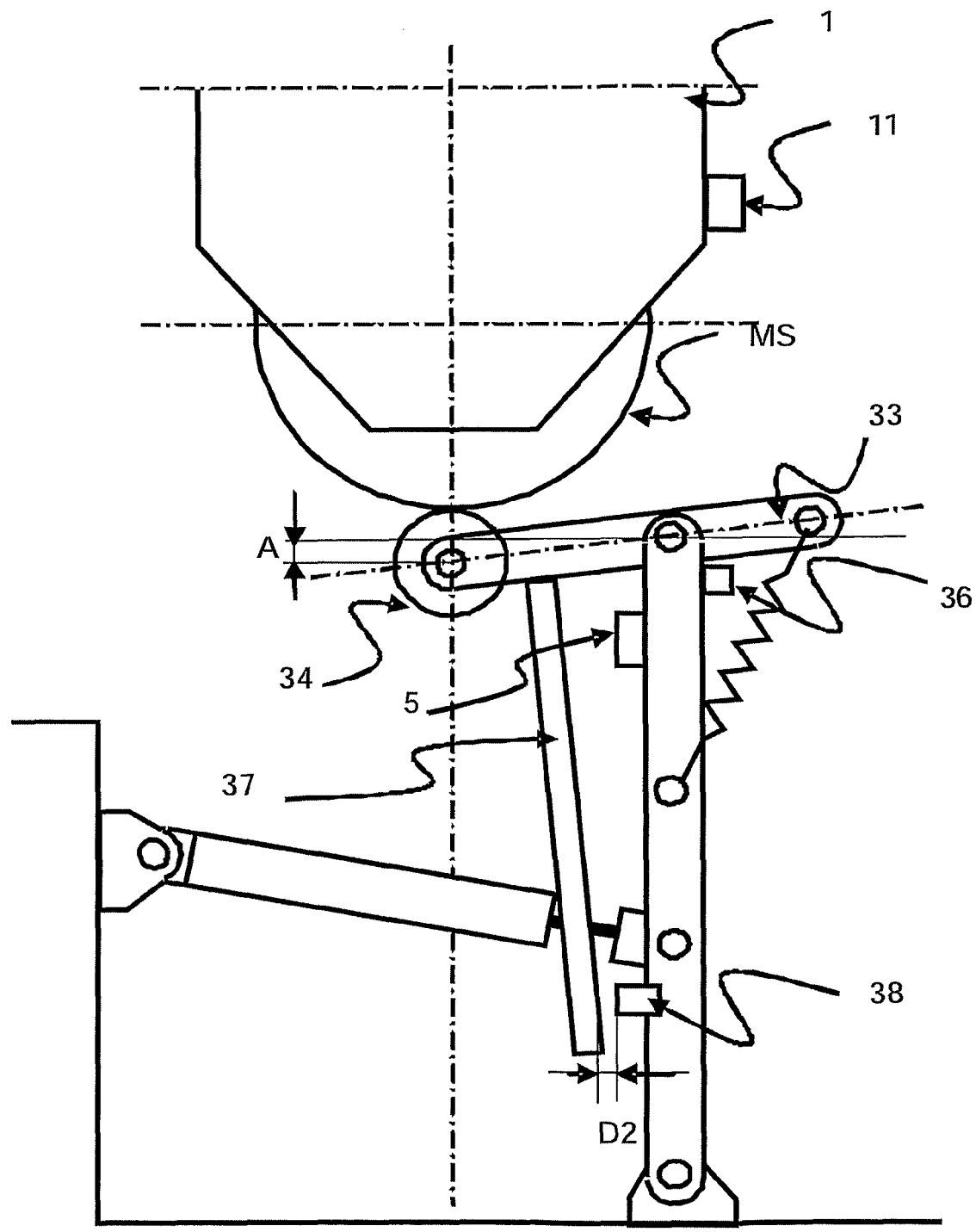
FIG. 3c: operating sequence of the adjusting device according to the invention: tool in the adjusting position.

FIG. 3c shows the tool in the adjusting position, the wheel (MS) being progressively lowered by means of a motorized carriage (not shown) into contact with the roller (34), the wheel pivoting the arm (33) as a result of pressure and the index (37) moving closer to the position detection and measuring device (38) by a distance (D2) corresponding to a vertical movement (A) of the roller (34). By its construction, in other words by means of the fixed welding head stop (11), the roller (34) brings its upper face level with the reference plane (PR) or possibly at a given distance from the plane (PR). Thus, whatever the new diameter or old diameter of the wheel (MS), the lower face is in the position required for quality welding. This position is recorded as a reference point in a system for controlling a motorized carriage which displaces the welding head (1).

The method for measuring distance comprises the steps of:
a) positioning a rotating roller 34 which is fastened to a tiltable frame 3 in a measuring position, the measuring position being vertically below a reference wheel MS,
b) continuously vertically lowering A the reference wheel MS, so that its lower surface comes into contact with the rotating roller 34 and produces a bearing force on the roller 34,
c) continuously moving the roller 34 in the direction of lowering A,
d) repeatedly measuring a distance D2 between an index 37 which is secured to a measuring arm 33 of the frame 3 and an articulated post 32 fixed to the frame 3 during the continuous movement,
e) comparing the distance D2 with a distance threshold for each of the repeated measures until the wheel MS reaches a first operating position in which the distance D2 is equal to a predefined factor of the distance threshold,
f) recording the first operating position as a reference point in a system for the vertical movement of the reference wheel MS.

With regard to the prior art already mentioned, one main advantage of the invention is to eliminate stopping a production line in order to monitor the position of the jaws, thus making it possible to increase the productivity of said production line. A further major advantage is the increase in safety for production line operators, thus relieved of any manual operations on the welding machine.

One additional feature of the invention consists in being able to adopt one of two methods for positioning the reference wheel MS: stopping the vertical lowering A and locking the reference wheel MS in the first operating position; stopping the vertical lowering A in the first operating position and subsequent vertical movement of the reference wheel MS in a second operating position, the second operating position being adjustable remotely by an operator. Advantageously, the two possibilities make it possible to adapt an operating position by taking into account specific features of the welding machine, in particular the structure for supporting the wheels. The welding force applied by a hydraulic cylinder to the lower wheel MI may cause slight deformation of said structure and, due to said deformation, may also cause a slight shift from the first operating position of the reference wheel MS. As a result, it may be necessary to adjust said first position so that after this adjustment the reference wheel is located in the second operating position.

A further feature of the invention consists in that a diameter of the reference wheel MS is calculated after having positioned the wheel MS in the first operating position or the second operating position. This feature advantageously makes it possible to verify regularly the wear of the wheel MS, so as to detect wear beyond the tolerance limits. Given the position of the reference plane PR, an initial position of the suspension point C of the wheel and the vertical movement A, the diameter is calculated by subtracting the value of the vertical movement A from the value of the distance between the reference point PR and the suspension point C.

One additional feature of the invention consists in that the position is measured after changing or remachining the reference wheel MS and a second wheel MI. Advantageously, it is possible to readjust the height of the reference wheel MS relative to the reference plane PR, taking into account the changed diameter, as a result of remachining or changing said wheel MS.

A further feature of the invention consists in that the measurement is adapted for positioning reference wheels MS of different diameters. This feature makes the method very flexible and adaptable for welding machines of different sizes.

Depending on the precision required by the welding, it is possible to adopt three measuring methods: a measurement at the end of each welding process; at least two measurements during a series of welding processes; and a measurement initiated by a production line operator. The method for determining the degree of wear of the reference wheel MS is advantageously flexible. For example, the automatic measurement at the end of each welding process provides maximum positioning accuracy, for welds of very high quality, which is especially important for small thicknesses of the strip B. Apart from the measurements automatically carried out, a further advantage is the possibility of manually initiating a measurement by the intervention of a production line operator.

The implementation of the measuring method is provided by a measuring device adapted for positioning the wheels of a mash seam resistance welding machine for the purpose of butt-joining steel strips on continuous processing lines, comprising:
- a hydraulic cylinder 4 actuating a tiltable frame 3 from a non-active parking position to an active measuring position,
- a measuring arm 33 coupled to an articulated post 32, the arm 33 and the post 32 being fixed to the tiltable frame 3, and the arm being coupled to the frame 3 using a resilient return member 35,
- a rotating roller 34 carried by the measuring arm 33,
- a position detection and measuring device 38 fixed to the frame 3,
- an index 37 fixed to the arm 33 of sufficient length so that its position is able to be detected by the detection device 38,
- a device stop 5 mechanically blocking a movement of the frame 3 beyond the active measuring position,
- a stop fixed to the post 36 which prevents a return of the arm 33 beyond the parking position, caused by the resilient member 35.

Advantageously, the device according to the invention is adapted so as to permit a dimensioning of a length of the measuring arm 33 and a length of the articulated post 32 such that a ratio between the two lengths determines and provides an extended range of measurable values of the position of the index 37. This advantageously makes it possible to improve the accuracy required for measuring the position. A second advantage is the flexibility for adapting the device for implementation in different variants of welding machines. This means that a radius of the wheels used in a welding machine determines a minimum length of the measuring arm 33. The length of the arm 33 has to be selected to be greater than the radius of the lower wheel MI. This requirement is set because of the tilting of the device from the parking position into the measuring position, so that the measuring arm 33 is displaced above the lower wheel MI. Thus, the length of the post 32 is dimensioned according to the length of the arm 33 required to satisfy a ratio of the lengths according to the range of measurable values to be obtained.

A variant of the device comprises two superposed rollers capable of coming into contact respectively with a lower welding wheel MI on the steel strip and the wheel (MS) and to subject said two wheels MI, MS to a cold working treatment of their external surfaces. Advantageously, in addition to its role as adjusting member, the device may be used to carry out on the lower face of the reference wheel MS and the upper face of the lower wheel MI a cold working treatment aiming to restore to said surfaces a hardness which has been reduced by the heating thereof during welding.

The measuring device is adapted for positioning the wheels and to achieve this the detection and measuring device 38 comprises optical means for measuring distance. The detection means 38 comprises, for example, a laser for measuring the distance between the index 37 and the frame 32. The device 38 may also use ultrasound means for measuring distance.

ABBREVIATIONS

B=steel strip
DER=unwinding assembly
DER 1=unwinder 1
DER 2=unwinder 2
SOUD=welding machine
ACCU 1=strip storage device
TRANS=processing section
ACCU 2=outlet storage device
CIS=shears
ENR=winding device
ENR 1=winder 1
ENR 2=winder 2
1=welding head
MS=reference wheel
MI=lower wheel on the strip
JS=joint to be welded
PR=reference plane
QB=first strip
TB=second strip
ES, EI=inlet jaws
SS, SI=outlet jaws
FS=clamping force of the wheels
3=adjusting frame
4=hydraulic cylinder
5=fixed device stop
11=fixed welding head stop
31=pivot clevis
32=articulated post
33=measuring arm
34=rotating roller
35=resilient return member
36=stop fixed to the post
38=position detection and measuring device
D1=maximum distance of the index from the position measuring device for the tool in the vertical position
D2=distance of the index from the position measuring device for the tool in the measuring position
A=vertical movement of the roller
C=suspension point of the reference wheel

The invention claimed is:

1. A position-measuring method for positioning a wheel in a mash seam resistance welding process for butt-joining steel strips on a continuous processing line, the method which comprises:
    a) positioning a rotary roller which is fastened to a movable frame in a measuring position vertically below a reference wheel;
    b) continuously lowering the reference wheel in a vertical direction so that a lower surface thereof comes into contact with the rotary roller and produces a bearing force on the roller;
    c) continuously moving the roller in the vertical direction;
    d) repeatedly measuring a distance between an index that is secured to a measuring arm of the movable frame and an articulated post fixed to the movable frame during the continuous movement;
    e) comparing the distance with a distance threshold for each of the repeated measurements until the reference wheel reaches a first operating position in which the distance is equal to a predefined factor of the distance threshold; and
    f) recording the first operating position as a reference point in a system for the vertical movement of the reference wheel.

2. The method according to claim 1, which comprises adopting one of the following two methods for positioning the reference wheel:
    stopping the vertical lowering and locking the reference wheel in the first operating position; or stopping the vertical lowering in the first operating position and subsequently moving the reference wheel vertically in a second operating position, wherein the second operating position is adjustable remotely by an operator.

3. The method according to claim 2, which comprises calculating a diameter of the reference wheel after having positioned the wheel in the first operating position or in the second operating position.

4. The method according to claim 1, which comprises measuring the position after changing or remachining the reference wheel and a second wheel.

5. The method according to claim 1, wherein the position measurement is adapted for positioning reference wheels of different diameters.

6. The method according to claim 1, which comprises adopting at least one of the following three measurement methods:
  carrying out a measurement at the end of each welding process;
  carrying out at least two measurements during a series of welding processes; or
  carrying out a measurement initiated by a production line operator.

7. A measuring device adapted for positioning the wheels of a mash seam resistance welding machine for butt-joining steel strips on a continuous processing line, comprising:
  a tiltable frame and an hydraulic cylinder for actuating said tiltable frame from a position of repose to an active measuring position;
  said tiltable frame including an articulated post and a measuring arm articulated on said post, and a resilient return member coupling said arm to said post;
  a rotary roller carried by said measuring arm;
  a position detection and measuring device fixed to said frame;
  an index fixed to said measuring arm, said index having a length enabling a position thereof to be detected by said position detection and measuring device;
  a device stop disposed to mechanically block a movement of said frame beyond the active measuring position; and
  a stop affixed to said post and disposed to oppose said resilient return member to prevent a return of said measuring arm beyond the parking position.

8. The device according to claim 7, wherein a ratio between a length of said measuring arm and a length of said articulated post determines a range of measurable values of the position of said index.

9. The device according to claim 7, comprising two superposed rollers capable of coming into contact respectively with a lower welding wheel on the steel strip and a reference wheel and to subject an active external surface of said active welding wheel and an external surface of said reference wheel to a cold working treatment.

10. The device according to claim 7, wherein said position detection and measuring device comprises optical distance measurement means.

11. The device according to claim 10, wherein said position detection and measuring device comprises ultrasound distance measurement means.

* * * * *